US008973156B2

(12) United States Patent
Wang et al.

(10) Patent No.: US 8,973,156 B2
(45) Date of Patent: Mar. 3, 2015

(54) MULTI-USER LIMITED RESOURCE ALLOCATION PROCESSING METHOD AND SYSTEM

(71) Applicant: Alibaba Group Holding Limited, George Town, KY (US)

(72) Inventors: Xiang Wang, Hangzhou (CN); Fang Chen, Hangzhou (CN); Chunchun Huang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 13/658,487

(22) Filed: Oct. 23, 2012

(65) Prior Publication Data

US 2013/0111607 A1    May 2, 2013

(30) Foreign Application Priority Data

Oct. 27, 2011    (CN) .......................... 2011 1 0332671

(51) Int. Cl.
*H04L 29/06*    (2006.01)
*G06Q 10/06*    (2012.01)

(52) U.S. Cl.
CPC ..................... *G06Q 10/06* (2013.01)
USPC ............................ 726/28; 713/168

(58) Field of Classification Search
USPC .......................................................... 726/28
See application file for complete search history.

(56) References Cited

U.S. PATENT DOCUMENTS

| 6,269,343 | B1 * | 7/2001 | Pallakoff ..................... 705/26.2 |
| 6,934,690 | B1 | 8/2005 | Van Horn et al. |
| 7,089,204 | B1 | 8/2006 | Nieboer et al. |
| 7,263,496 | B1 | 8/2007 | Weigelt et al. |
| 2003/0126040 | A1 * | 7/2003 | Mesaros ......................... 705/26 |
| 2009/0228965 | A1 * | 9/2009 | Klippgen ......................... 726/6 |

FOREIGN PATENT DOCUMENTS

WO    WO 0058895 A2 * 10/2000

* cited by examiner

*Primary Examiner* — Yogesh Paliwal
(74) *Attorney, Agent, or Firm* — Van Pelt, Yi & James LLP

(57) ABSTRACT

Embodiments of the present application relate to a multi-user limited resource allocation processing method, a multi-user limited resource allocation processing system, and a computer program product for allocating a limited resource among a plurality of users. A multi-user limited resource allocation processing method is provided. The method includes receiving a plurality of participation requests for a limited resource from a plurality of users and determining the number of the plurality of users sending the plurality of participation requests. In response to the number of the plurality of users reaching a predetermined value, revising data corresponding to the limited resource according to a revision rule and allocating the limited resource to the plurality of users sending the participation request using the revised data.

14 Claims, 5 Drawing Sheets

MULTI-USER LIMITED RESOURCE ALLOCATION PROCESSING METHOD AND SYSTEM

CROSS REFERENCE TO OTHER APPLICATIONS

This application claims priority to People's Republic of China Patent Application No. 201110332671.4 entitled A MULTI-USER LIMITED RESOURCE ALLOCATION PROCESSING METHOD AND SYSTEM filed Oct. 27, 2011 which is incorporated herein by reference for all purposes.

FIELD OF THE INVENTION

This application relates to a multi-user limited resource allocation processing method and system.

BACKGROUND OF THE INVENTION

Multiple users may be involved in data processing. However, with limited resources, multiple users may compete for the limited resources. One method for data processing involves comparing data transmitted by users. Ultimately, determining the user to allocate a resource involves a process including numerous comparisons. In such a method, the server typically will constantly compare data transmitted by the users, and a single user may make multiple data transmissions to the server to win the resource. Accordingly, as the number of users increases, the server must execute an increasing number of comparisons. Thus, as the volume of data processed increases, the load on the server increases.

For example, one online shopping method involves multiple users competing to purchase a limited quantity of a product. The users who obtain the product bid at a price higher than the price bid by other users. In this shopping method, the server must first receive participation requests from users within a predetermined time period. Subsequently, the server receives a price from a first user and compares the received price to a price received from a second user. The price received from the second user has the highest previous price. The price received from the first user must be higher than the price received from the second user in order for the bid to be successful. If the price received from the second user is higher than the price received from the first user, then the server returns a notice to the second user that their bid was successful. Also, the server notifies all other users of the current price, and lets all the users continue bidding until the predetermined time period ends. The server continues the bidding until the end of the time period in order to obtain the highest possible price. During this time period, a single user may make multiple bids. As a larger number of users submit bids, the server must process more data. Accordingly, as the volume of data being processed increases, the stress on the server increases.

Throughout the competitive bidding process, the server receives multiple transmissions of data from the users. Accordingly, for each received bid, the server must receive data, compare the data, confirm the data, and return the data continuously. Thus, the server processes a large volume of data and consumes a great amount of resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

This application discloses a multi-user limited resource allocation processing method and system. The method discloses reducing a volume of data to process by a server and reducing stress on the server.

Figure 1:
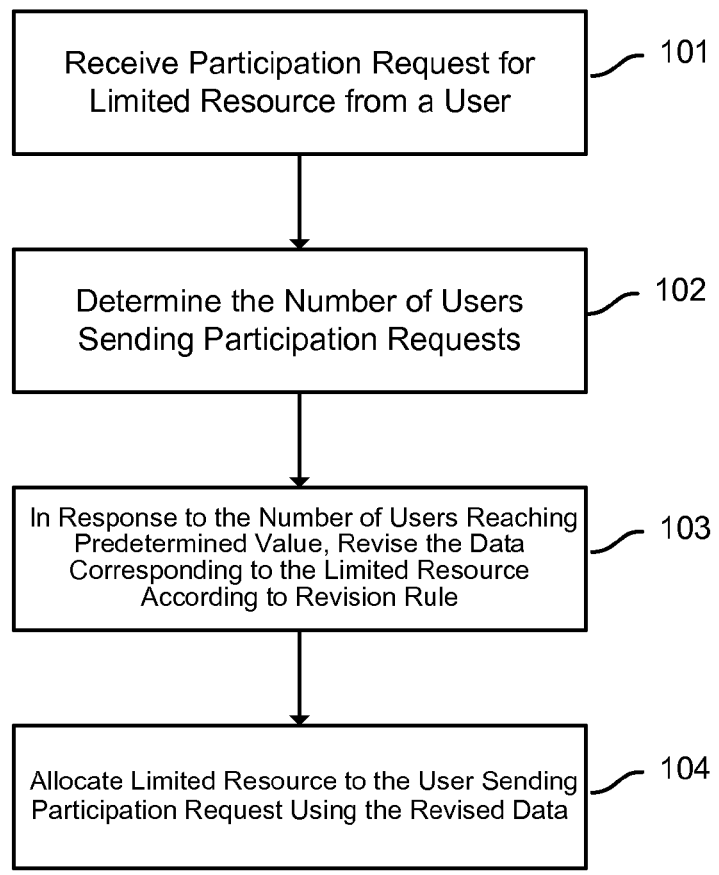
FIG. 1 is a flowchart illustrating an example of a multi-user limited resource allocation processing method.

FIG. 1 is a flowchart illustrating an example of a multi-user limited resource allocation processing method.

In step 101, the server receives a participation request for the limited resource from a user.

In order for the user to be allocated the limited resource, the user sends a participation request to the server. To be allocated the limited resource, the user transmits a participation request to the server. There may be more than one user transmitting a participation request. Accordingly, the server receives the transmitted participation request for the limited resource from each user desiring an allocation of the limited resource.

In step 102, the server determines the number of users sending participation requests. The requests may be sent over a hypertext transfer protocol (HTTP), or another network protocol.

Upon receipt of the participation requests from the users, the server may determine the number of users sending the participation requests by counting the number of participation requests received.

In step 103, in response to the number of users reaching a predetermined value, the server revises the data corresponding to the limited resource according to a revision rule. The revision rule may include more than one rule. The data corresponding to the limited resource may relate to the price of the limited resource.

In response to the number of users reaching the predetermined value, the server may revise the data corresponding to the limited resource based on the revision rule. For example, the revision rule may include the following: In response to the number of users reaching N, the data corresponding to the limited resource data is set to X, and in response to the number of users reaching 2N, the revised data corresponding to the limited resource is set to Y. Accordingly, in response to the number of users reaching N or 2N, the corresponding revising operation may be executed.

In step 104, the server allocates the limited resource to the users who have sent participation requests. As shown, the allocation of the limited resource is based on the revised data corresponding to the limited resource based on the number of users who have sent the participation request.

The server may allocate the limited resource to the users who have sent the participation request. The allocation of the limited resource may be based on the revised data corresponding to the limited resource. The data may be revised based on the number of users sending the participation request. For example, upon receipt of the participation request, the server may allocate the limited resource. The limited resource may be allocated based on the revised data corresponding to the limited resource. The data may be revised based on the number of users sending the participation request.

For example, the server receives a participation request. At this time, the number of users corresponds to N, thus the data corresponding to the limited resource is X. Subsequently, X is used to allocate the limited resource to the users.

In one example, the processing described above may be performed when the limited resource has not been fully allocated. In another example, in response to the resource being fully allocated, no further processing is performed.

Accordingly, the server may receive a participation request for the limited resource from a user. The server determines the number of users sending participation requests. In response to the number of users reaching a predetermined value, the server revises the data corresponding to the limited resource according to a revision rule. The server allocates the limited resource to the user according to the number of users sending the participation request. In response to a resource having a limited quantity and the number of users being relatively large in comparison to the quantity of the resource, the server only needs to determine the number of users sending participation requests, receive the participation requests, and allocate the resource. Moreover, a single user does not need to repeatedly transmit participation requests. The server may only need to receive one participation request for each user. By reducing the number of participation requests sent by the users, the server processes a reduced volume of data, and accordingly, less stress is placed on the server.

In another example, the data corresponding to the limited resource may relate to price, and the server may revise the data corresponding to the limited resource according to a revision rule. The revision rule may include in response to the number of users reaching a predetermined value, an adjustment (e.g., lowering) of the price by the server corresponding to the limited resource.

For example, the revision rule may include the following: the initial price corresponding to the limited resource is X; in response to the number of users corresponding to N, the price corresponding to the limited resource is lowered so that the price corresponds to $0.8*X$; and in response to the number of users corresponding to 2N, the price corresponding to the limited resource is lowered so that the price corresponds to $0.6*X$. Thus, in response to the number of users being less than N, the price corresponding to the limited resource corresponds to X; in response to the number of users being greater than or equal to N and being less than 2N, the price corresponding to the limited resource corresponds to $0.8*X$; and in response to the number of users being greater than or equal to 2N, the price corresponding to the limited resource corresponds to $0.6*X$. In some embodiments, all the users receive the limited resource at the lowest final price. In some embodiments, the users receive the limited resource at the price that was requested during the auction.

In another example, the server may allocate the limited resource to users sending the participation request using the revised data corresponding to the limited resource according to the number of users. First, the server receives resource requests from the users sending the participation requests. Second, the server uses the price of the limited resource correspondingly revised based on the number of users, and allocates the resource to the users using the revised price of the resource.

For example, the server receives a participation request transmitted by a user. At this time, the number of users corresponds to N, thus the price of the limited resource corresponds to $0.8*X$, and the resource is allocated to the corresponding users using the price corresponding to $0.8*X$. As a non-limiting example, initially assume that N is 100 and the price of X is $100. In response to the number of users reaching 100, the price corresponding to the limited resource is lowered to $80. In response to the number of users reaching 200, the price corresponding to the limited resource is lowered to $60. Subsequently, assuming that the final number of users is 200, the 200 users who sent participation requests then are allocated the limited resource at a price of $60.

In response to the number of users being less than N, the price of the limited resource is X, and the limited resource is allocated to the users according to the price being X.

In another example, the server may receive a participation request from a user that includes the following steps:

First, upon receiving the participation request from the user, the server may transmit authentication information to the user sending the participation request.

In response to a system configuration requiring user authentication, upon receipt of the participation request transmitted by the user, the server may transmit authentication information to the user. The purpose of the transmission of the authentication information is to determine whether the user is authorized to participate in the resource allocation processing method.

Second, the server receives and authenticates the authentication data returned by the user. Upon a successful authentication, the participation request is successfully transmitted by the user.

Upon receipt of the authentication information from the server, the user sending the participation request will return the relevant authentication data to the server. Upon receipt of the authentication data from the user, the server performs an authentication. Upon authenticating the user, the server can determine whether the user is successfully authenticated. Upon a successful authentication, the server determines that the participation request sent by the user is successfully transmitted. For example, the user is permitted to participate in the resource allocation processing method of the limited resource. As another example, the system may be configured to not require user authentication prior to participation in the resource allocation processing method.

In another example, the user may be related to a mobile telephone number, and the server may send a text message to authenticate the user. In yet another example, the user may be related to an email address, and the server may send an email message to authenticate the user.

In another example, the resource allocation processing method may have a preconfigured starting time, a preconfigured termination time, and a preconfigured quantity of resources. For example, the resource allocation processing method may have a preconfigured starting time when the server is able to receive participation requests, may have a preconfigured termination time when the server terminates receiving participation requests, and may have a predetermined quantity of the limited resources.

In other words, the time the allocation begins and ends and the quantity of the limited resource may be preconfigured in advance. Accordingly, preconfiguring the starting time and termination time of the resource allocation processing method and the quantity of the limited resource in a configuration file may be possible.

In another example, the resource allocation processing method may be terminated in response to a predetermined termination time being reached and/or in response to the quantity of the resource being 0.

Additionally, the resource allocation processing method may be terminated in response to reaching a predetermined termination time. The limited resource may not have been fully allocated when the termination time is reached. The resource allocation processing method may also be terminated in response to the quantity of the limited resource reaching 0. In other words, when the quantity of the limited resource is 0, the limited resource has been fully allocated. Upon a full allocation of the limited resource, the preconfigured termination time may not have been reached.

The two types of termination may be implemented simultaneously, or any one of the two types of termination may be implemented. However, the present application is not limited to those two types of termination. Other types of termination understood by one of ordinary skill may additionally be implemented.

Below is a resource allocation processing method illustrating an example of an online shopping method whereby a plurality of users compete to purchase limited resources.

Figure 2:
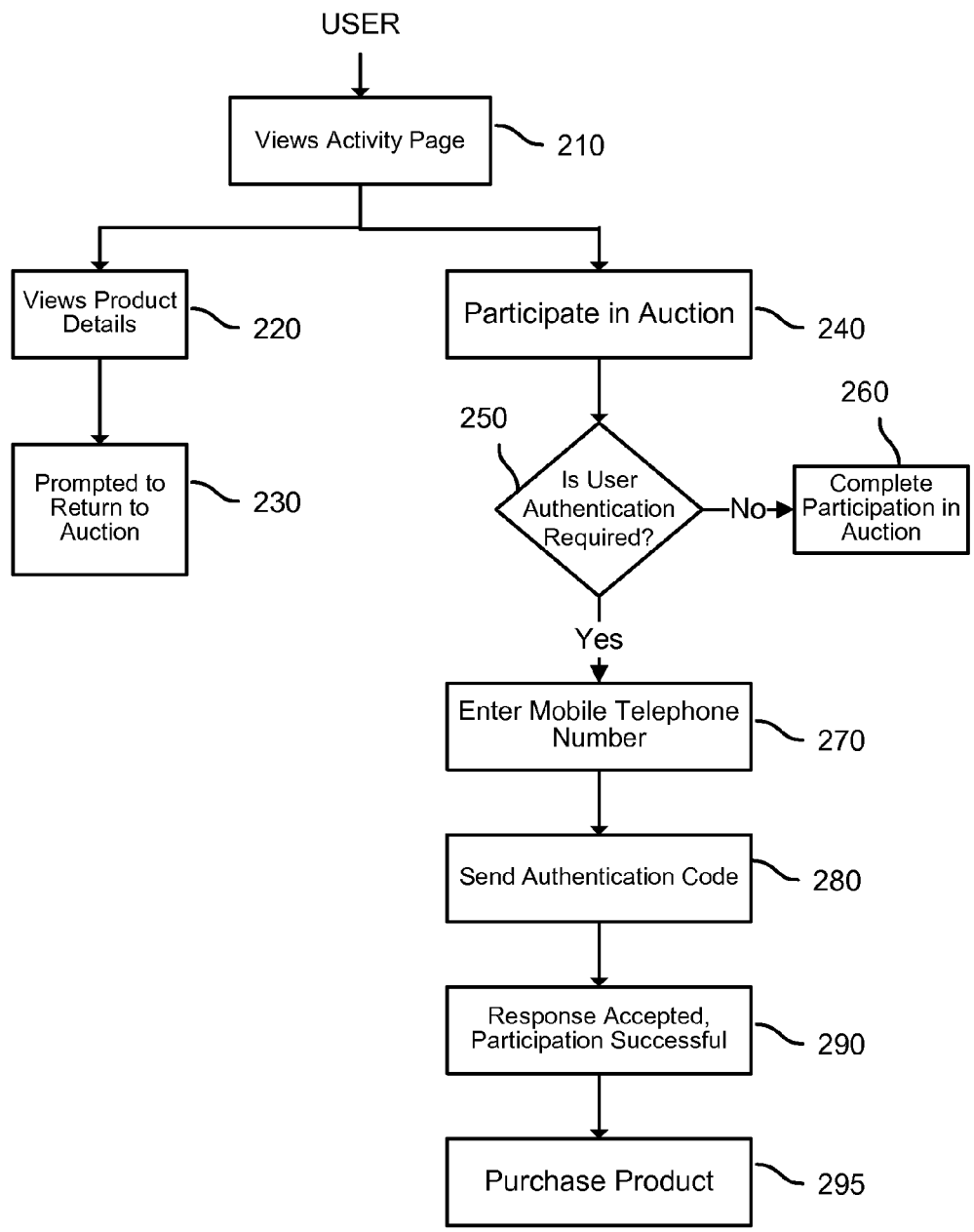
FIG. 2 is a flowchart illustrating an example of a foreground process of the multi-user limited resource allocation processing method.

Referring to FIG. 2, FIG. 2 illustrates an example of a flowchart of a foreground process in the online shopping method.

In response to a user desiring to participate in an auction to purchase a product having a limited quantity, the user may view an activity page (210). The user may view product details of the product from the activity page (220). The product may only be purchased by participating in the auction. In response to the user desiring to purchase the product, the user may purchase the product by returning to the activity page (230).

From the activity page, the user may issue a request to participate in the auction (240). For example, the user may transmit a participation request to the server. Based on a system configuration, a determination is made as to whether user authentication is required in order for the user sending the participation request to be allowed to participate in the auction (250). In one example, in response to user authentication not being required, the user's participation request is accepted and the user is allowed to participate in the auction (260). In another example, in response to user authentication being required, the user may be prompted to enter his/her mobile telephone number (270). Subsequently, a text message may be sent to the user and the user may respond to the text message with a text message containing an authentication code (280). Upon receipt of the text response and successful authentication of the authentication code, the user's participation in the auction may be successful (290). After the user is authenticated to be allowed to participate in the auction and after the system determines the current price of the product based on the revision rule, the server may display the current price of the product to the user.

Upon being allowed to participate in the auction, the user may decide to purchase the product based on the displayed current price of the product, or the user may decide to wait for more people to participate in the auction and proceed to purchase the product in response to the price of the product being lowered (295). In response to the user deciding to purchase the product, the user may send a participation request to the server and then pay the corresponding price to purchase the product.

Figure 3:
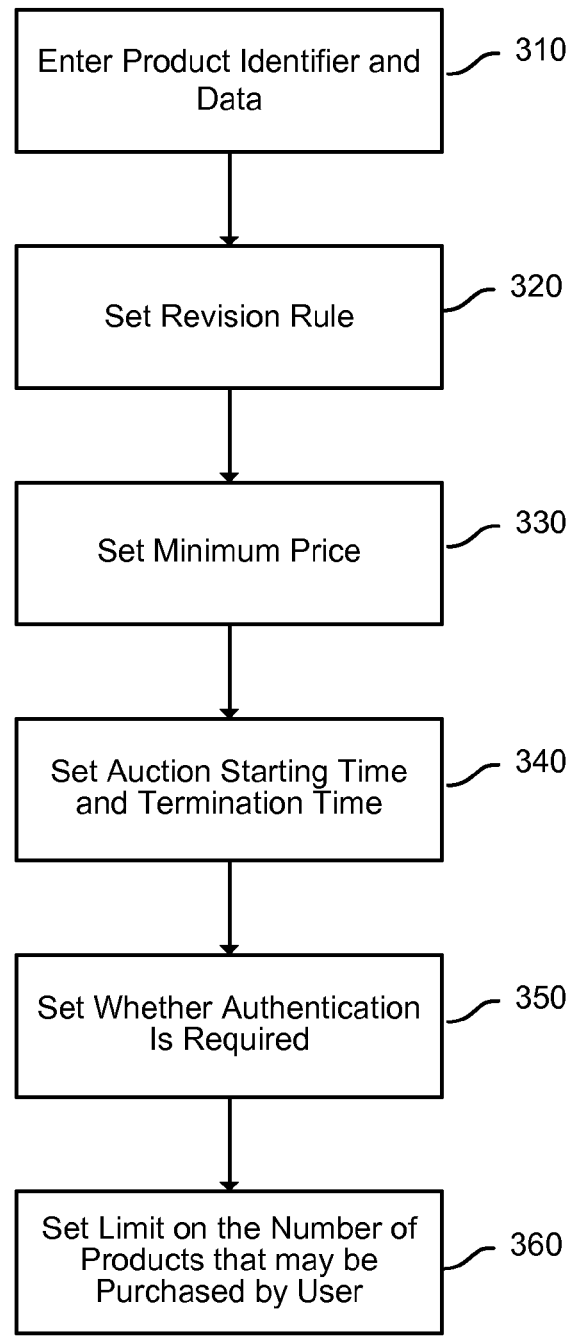
FIG. 3 is a flowchart illustrating an example of a background process of the multi-user limited resource allocation processing method.

Referring to FIG. 3, FIG. 3 illustrates an example of a flowchart of a background process in the online shopping method.

An operator may preconfigure a system. For example, a product identifier corresponding to a product and data related to the product are entered (310). The quantity of the product and the data including an initial price of the product may be entered. The revision rules (also known as trading rules) may be preconfigured (320). For example, the revision rules may include how much the product price is reduced in response to a predetermined number of users being reached. For example, in response to the number of users reaching 100, the product price is reduced by 8 percent. In another example, a minimum price for the product may be set (330). For example, the lowest price that the product may reach may correspond to the minimum price. The operator may also preconfigure a starting time and a termination time of the online shopping method (340) and set whether user authentication is required (350) in order to participate in the online shopping method. Also, the operator may preconfigure the system to set a limit on the quantity of products a user may purchase as well as on the total number of products available for purchase by the users (360).

In response to completion of the preconfiguration of the revision rules and the system configuration, the online shopping method may begin. The server may receive a participation request from a user, may send authentication information, and may receive and authenticate the returned authentication data from the user. The server may determine the number of users and, based on the revision rules and in response to the number of users reaching the predetermined value, the server may lower the current price of the product based on the revision rules, until the price has been lowered to the minimum price. During this time, in response to receiving the participation request sent from the user, the product may be allocated to the users based on the current price of the product.

The online shopping method described above combines many of the benefits of auctions and group buying. The larger the number of people participating in the online shopping method, the lower the price of the product. As an aspect of the shopping method, the method does not require users to pay attention in real time to whether or not they are sending a price. This shopping method allows the number of users participating in the online shopping method to increase while minimizing stress on the server.

The server only determines the number of users sending participation requests, receives the participation requests, and allocates the product. A single user is not required to repeatedly compare price on the server. Instead, the server may only receive one participation request per user, so that in response to the number of users being the same, the server has reduced the volume of data to process and has reduced stress on the system.

Figure 4:
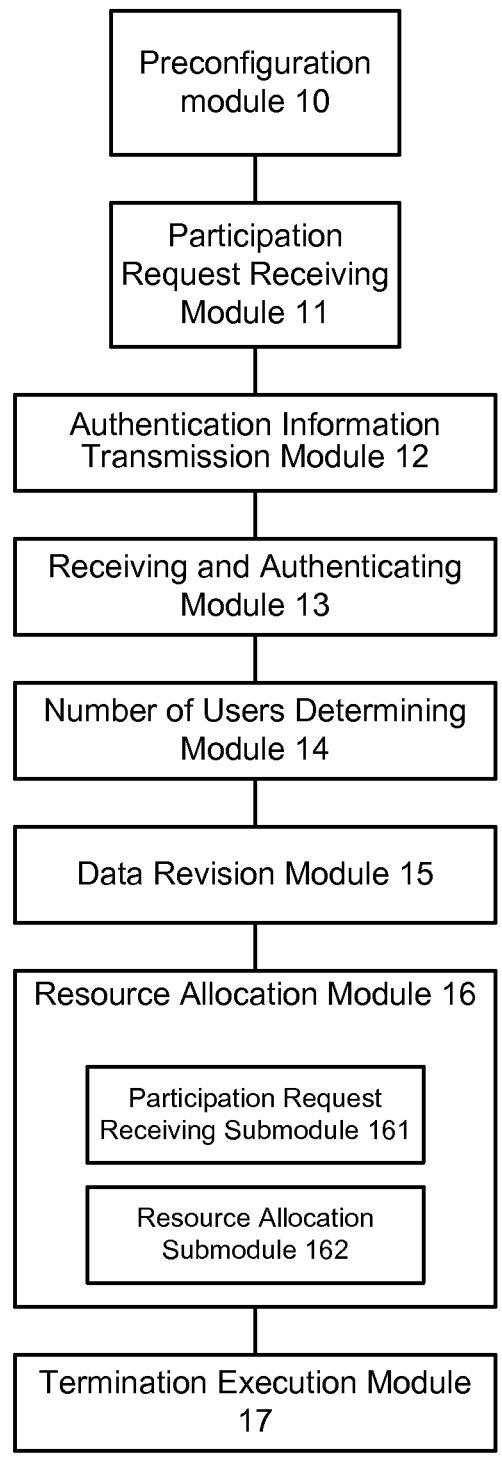
FIG. 4 is a diagram illustrating an example of a multi-user limited resource allocation processing system.

Referring to FIG. 4, FIG. 4 illustrates an example of a schematic diagram of the multi-user limited resource allocation processing system.

The multi-user limited resource allocation processing system includes a participation request receiving module 11, a number of users determining module 14, a data revision module 15, and a resource allocation module 16.

The participation request receiving module 11 may receive a participation request corresponding to a limited resource from a user.

The number of users determining module 14 determines the number of users sending participation requests.

The data revision module 15 revises the data corresponding to the limited resource according to a revision rule in response to the number of users reaching a predetermined value.

The resource allocation module 16 allocates the limited resource to the user based on the revised data. As an example, the data of the limited resource may include price.

In another example, the data revision module 15 may lower the price corresponding to the limited resource according to the revision rule in response to the number of users reaching a predetermined value. In another example, the resource allocation module 16 may include: a participation request receiving submodule 161 configured to receive participation requests from users sending the participation requests, and a resource allocation submodule 162 configured to use the revised price corresponding to the limited resource based on the number of users to allocate the limited resource to users.

In another example, the resource allocation processing system may further include: an authentication information transmission module 12 configured to transmit authentication information to the user sending the participation request, and a receiving and authenticating module 13 configured to receive and authenticate authentication data returned by the user. Upon the user being successfully authenticated, the participation request is successfully received.

The resource allocation processing system may further include a preconfiguration module configured to preconfigure a starting time of the online shopping method, a termination time of the online shopping method, and a quantity of limited resource available in the online shopping method.

The resource allocation processing system may further include a termination execution module 17 configured to terminate the auction in response to the predetermined termination time being reached and/or the quantity of the limited quantity being 0.

The modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, networking equipment, etc.) implement the methods described in the embodiments of the present invention. The modules may be implemented on a single device or distributed across multiple devices. The functions of the modules may be merged into one another or further split into multiple submodules.

Figure 5:
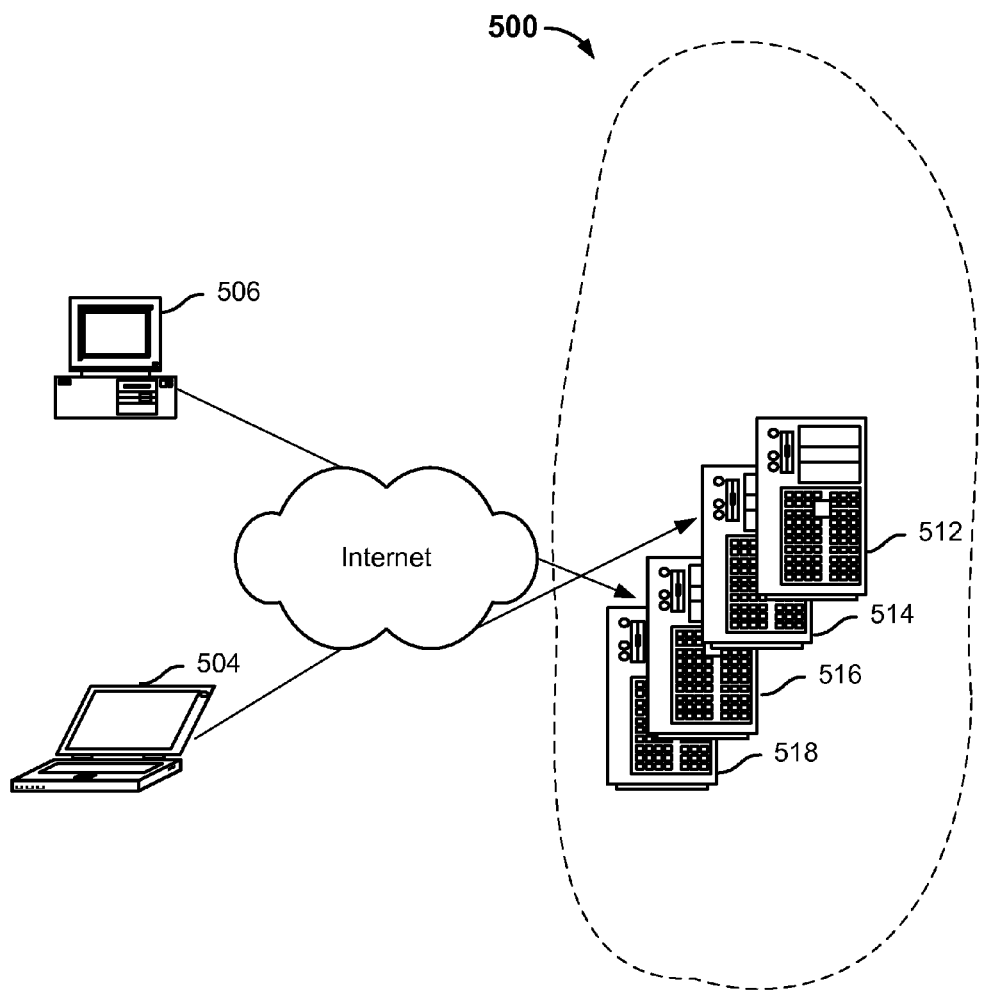
FIG. 5 is a block diagram illustrating another embodiment of the multi-user limited resource allocation processing system.

FIG. 5 is a block diagram illustrating another embodiment of the multi-user limited resource allocation processing system. In this example, system 500 includes a plurality of application servers 512, 514, 516, and 518. Although four application servers are used for purposes of example, different numbers of application servers may be used in other embodiments. URL resource access requests from clients such as 504 and 506 are received by the application servers. The clients and the application servers may communicate over TCP/IP or any other network protocol.

The application servers 512, 514, 516, and 518 may receive a participation request for a limited resource from a client 504 and/or 506. The application servers 512, 514, 516, and 518 determine the number of clients sending the participation request. In response to the number of clients reaching a predetermined value, the application servers 512, 514, 516, and 518 revise data corresponding to the limited resource according to a revision rule. The application servers 512, 514, 516, and 518 allocate the limited resource to the client sending the participation request using the revised data. The revised data may correspond with a price. The limited resource may be a product, such as, for example, a computer or a toaster.

Each of the examples contained in this specification is described in a progressive manner, the explanation of each example discloses areas of difference from the other examples, and the descriptions thereof may be mutually referenced for portions of each example that are substantially identical or similar.

The multi-user limited resource allocation processing method and system disclosed by the present application have been described in detail above. This specification employs specific examples to expound the principles and forms of implementation of the present application. The above examples are only meant to aid in comprehension of the methods of the present application and of its core concepts. Moreover, a person of ordinary skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multi-user limited resource allocation processing method, the method comprising:
receiving, using a processor, a plurality of participation requests for a limited resource from a plurality of users, wherein the receiving of the plurality of participation requests comprises:
determining whether a user is to be authenticated in order to participate in an auction; and in the event that the user is to be authenticated in order to participate in the auction:
exchanging authentication information with the user's device to determine whether the user is allowed to participate in the auction;
determining, using the processor, the number of the plurality of users sending the plurality of participation requests;
in response to the number of the plurality of users reaching a predetermined value, revising, using the processor, data corresponding to the limited resource according to a revision rule, wherein the revision rule includes decreasing the data corresponding to the limited resource by a predetermined percentage each time the data is revised; and
allocating, using the processor, the limited resource to the plurality of users sending the participation request using the revised data, comprising:
allocating at least some of the limited resource to the user according to a first data corresponding to the data that was requested during the auction; and
allocating at least some of the limited resource to another user according to the revised data, wherein the revised data is lower than the first data.

2. The method as described in claim 1, wherein:
the data corresponding to the limited resource comprises price; and
in response to the number of users reaching the predetermined value, the revising operation includes adjusting the price.

3. The method as described in claim 1 further comprises preconfiguring a starting time for beginning the receiving operation of the participation request, a termination time for terminating the receiving operation of the participation request and a quantity of the limited resource.

4. The method as described in claim 1 further comprises executing a termination operation in response to a predetermined termination time being reached or a quantity of the resource being 0.

5. The method as described in claim 1, wherein each user is allocated a quantity of the limited resource no more than a predetermined maximum quantity.

6. The method as described in claim 1, wherein the exchanging of the authentication information with the user's device comprises:
prompting the user to enter their mobile telephone number;
receiving the user's mobile telephone number;
sending a text message to the user via the user's telephone number, the text message including an authentication code;
receiving a text response from the user, the text response including the authentication code; and
upon successful authentication of the authentication code, determining the user is allowed to participate in the auction.

7. A multi-user limited resource allocation processing system comprising:
one or more processors configured to:
receive a participation request for a limited resource from at least one client terminal, wherein the receiving of the participation request comprises:
determine whether a user is to be authenticated in order to participate in an auction; and
in the event that the user is to be authenticated in order to participate in the auction:
exchange authentication information with the user's device to determine whether the user is allowed to participate in the auction;
determine the number of the at least one client terminal sending the participation request;
in response to the number of client terminals reaching a predetermined value, revise data corresponding to the limited resource according to a revision rule, wherein the revision rule includes decreasing the data corresponding to the limited resource by a predetermined percentage each time the data is revised; and
allocate the limited resource to the at least one client terminal sending the participation request using the revised data, comprising:
allocate at least some of the limited resource to the user according to a first data corresponding to the data that was requested during the auction; and
allocate at least some of the limited resource to another user according to the revised data, wherein the revised data is lower than the first data; and
one or more memories coupled to the one or more processors, configured to provide the one or more processors with instructions.

8. The system as described in claim 7, wherein:
the data of the limited resource comprises price; and
in response to the number of client terminals reaching the predetermined value, the revising operation includes adjusting the price.

9. The system as described in claim 7, wherein the one or more processors preconfigure a starting time for beginning the receiving operation of the participation request, a termination time for terminating the receiving operation of the participation request, and a quantity of the limited resource.

10. The system as described in claim 7, wherein the one or more processors execute a termination operation in response to a predetermined termination time being reached or a quantity of the resource being 0.

11. A computer program product for allocating a limited resource among a plurality of users, the computer product being embodied in a non-transitory computer readable medium and comprising computer instructions for:
receiving a plurality of participation requests for the limited resource from the plurality of users, wherein the receiving of the plurality of participation requests comprises:
determining whether a user is to be authenticated in order to participate in an auction; and
in the event that the user is to be authenticated in order to participate in the auction:
exchanging authentication information with the user's device to determine whether the user is allowed to participate in the auction;
determining the number of the plurality of users sending the plurality of participation requests;
in response to the number of the plurality of users reaching a predetermined value, revising data corresponding to the limited resource according to a revision rule, wherein the revision rule includes decreasing the data corresponding to the limited resource by a predetermined percentage each time the data is revised; and
allocating the limited resource to the plurality of users sending the participation request using the revised data, comprising:
allocating at least some of the limited resource to the user according to a first data corresponding to the data that was requested during the auction; and allocating at least some of the limited resource to another user according to the revised data, wherein the revised data is lower than the first data.

12. The computer program product as described in claim 11, wherein:
the data corresponding to the limited resource comprises price; and
in response to the number of users reaching the predetermined value, the revising operation includes adjusting the price.

13. The computer program product as described in claim 11 further comprises preconfiguring a starting time for beginning the receiving operation of the participation request, a termination time for terminating the receiving operation of the participation request, and a quantity of the limited resource.

14. The computer program product as described in claim 11 further comprises executing a termination operation in response to a predetermined termination time being reached or a quantity of the resource being 0.

* * * * *